Oct. 20, 1964    H. N. JONES ETAL    3,153,280
FABRICATION OF NUCLEAR REACTOR FUEL ELEMENTS
Filed Feb. 7, 1961    4 Sheets-Sheet 1

INVENTORS
Herbert Noel Jones
Ian Cochran Campsie
BY
Lawson and Taylor

Oct. 20, 1964   H. N. JONES ETAL   3,153,280
FABRICATION OF NUCLEAR REACTOR FUEL ELEMENTS
Filed Feb. 7, 1961   4 Sheets-Sheet 3

INVENTORS
Herbert Noel Jones
Ian Cochran Campsie
BY
Larson and Taylor

Oct. 20, 1964  H. N. JONES ETAL  3,153,280
FABRICATION OF NUCLEAR REACTOR FUEL ELEMENTS
Filed Feb. 7, 1961  4 Sheets-Sheet 4

INVENTORS
Herbert Noel Jones
Ian Cochran Campsie
BY
Larson and Taylor

_United States Patent Office_ 3,153,280
Patented Oct. 20, 1964

3,153,280
FABRICATION OF NUCLEAR REACTOR
FUEL ELEMENTS
Herbert Noel Jones, Clifton Village, and Ian Cochran Campsie, Lea, near Preston, England, assignors to United Kingdom Atomic Energy Authority, London, England
Filed Feb. 7, 1961, Ser. No. 87,599
Claims priority, application Great Britain Feb. 10, 1960
7 Claims. (Cl. 29—473.3)

This invention relates to the manufacture of nuclear reactor fuel elements of the type comprising a fissile fuel member such as a rod of uranium totally enclosed in a protective sheath of material having a low neutron capture cross section.

Because of the disparity between the coefficients of thermal expansion of uranium and the material of the sheath (for example a magnesium based alloy), and temperature differences due to thermal lag coupled with softening and deformation of the material of the sheath due to temperature and pressure in use in a nuclear reactor, it is found that a longitudinal stretching of the sheath occurs relative to the fuel member which is partially cumulative on each thermal cycle traversed by the fuel element. In order to minimize the effect of this phenomenon, known as "ratchetting," the fuel member is provided with a series of spaced circumferential grooves along its length and the sheath is subjected to external pressure at an elevated temperature in order to force or coin the material of the sheath into the circumferential grooves and hence key the sheath to the fuel member.

Pressurisation in the above manner also forces the sheath into close contact with the fuel member and thus ensures good heat transfer between the fuel member and the sheath.

Pressurisation may be carried out using gas at a temperature of about 500° C. or hydraulically using oil heated in the region of 250° C. and applying a pressure in the range 10,000 p.s.i. to 16,000 p.s.i. When the fuel element is initially subjected to the hot gas or immersed in the hot oil and before pressure is applied, relative expansion between the sheath and the fuel member produces a gap between one or both ends of the fuel member and the end caps closing the sheath. Subsequent application of pressure forces the sheath and the end caps inwards into the gaps causing necking of the sheath in the region of the gaps and straining of the welds sealing the end caps in the sheath. Both these effects are unacceptable.

According to the invention pressurisation of a fuel element of the kind described is carried out with the fuel element held in a clamp which applies a longitudinal compressive stress to the sheath of the fuel element, said clamp being made of two or more materials in composite form so as to be matched in thermal expansion with the fuel member of the fuel element so that the sheath of the fuel element is allowed to elongate approximately by only the same amount as the fuel member on heating.

The clamp is preferably made in the form of a tube with end caps, one of the end caps being readily releasable by a simple mechanism, and the fuel element is contained by the tube with the sheath clamped in compression between the end caps. Where the sheath has multistart long pitch helical or longitudinal heat transfer fins the loading is applied through intermediate end rings which are located between the end caps of the clamp and the ends of the heat transfer fins so that the compressive loading is applied to the sheath through the heat transfer fins. However where the sheath of the fuel element has circumferential heat transfer fins, multi-start helical heat transfer fins of short pitch or a single start helical heat transfer fin of short pitch, the loading cannot be applied in this manner because, in the case of circumferential fins, the loading will be localised on a single fin at each end of the sheath, in the case of a single start helical fin, the loading will be localised on the first turn of the fin at each end of the sheath and, in the case of multistart helical fins, the loading will be localised on the first turn of one of the fins at each end of the sheath. Because of lack of strength this localisation of loading will cause distortion of the fins and hence is to be avoided. In this case end fitments may be provided for applying the load of the clamp to several of the fins at each end of the sheath where the fins are circumferental or through several of the turns of the fin or fins at each end of the sheath where the sheath has a single start helical fin of short pitch or multistart helical fins of short pitch. Such end fitments may of tubular form split diametrically and having an internal configuration so as to fit round and engage with the fin or fins at the ends of the sheath.

One form of clamp for carrying out the method of the invention will now be described by way of example with reference to the accompanying drawings in which.

Figure 1:
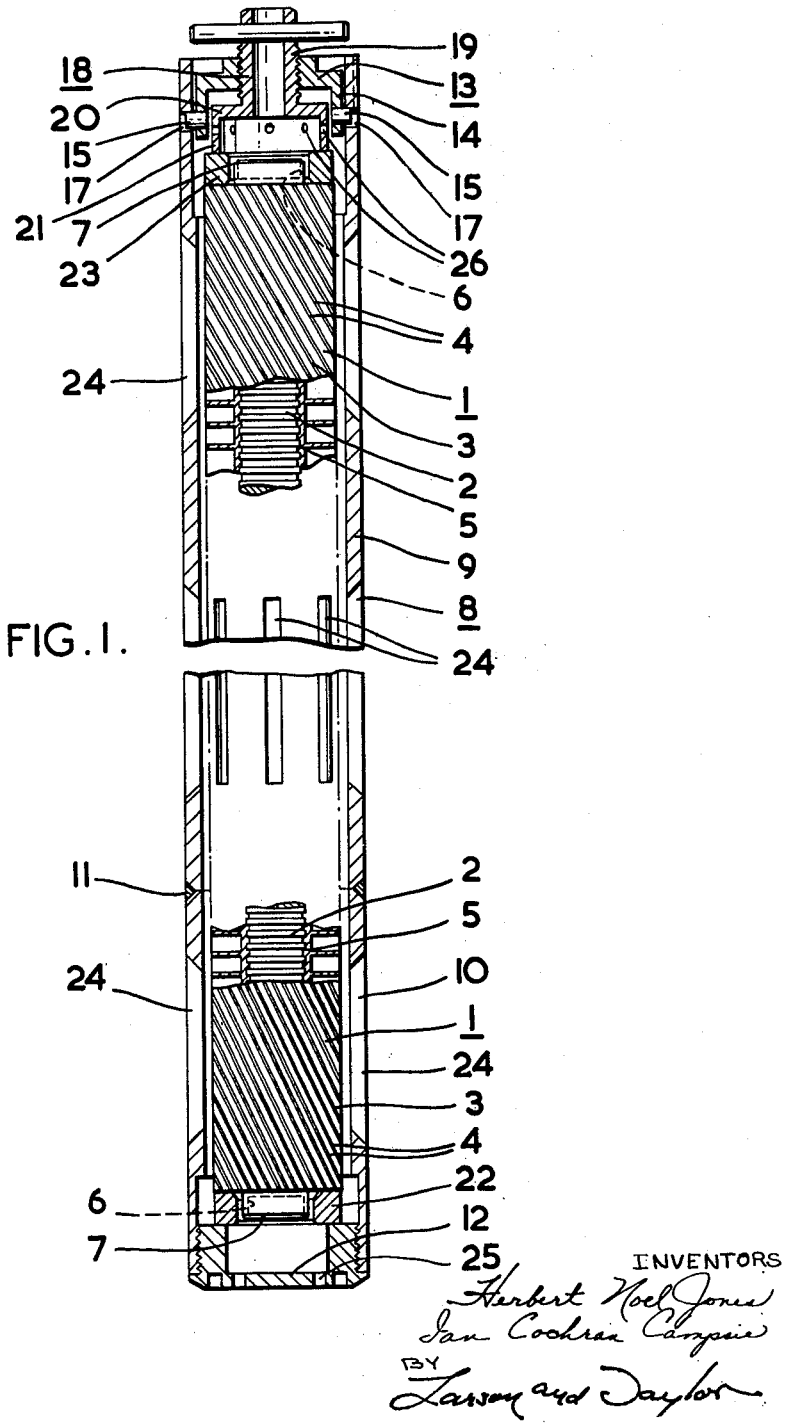
FIGURE 1 is a longitudinal sectional elevation.
Figure 2:
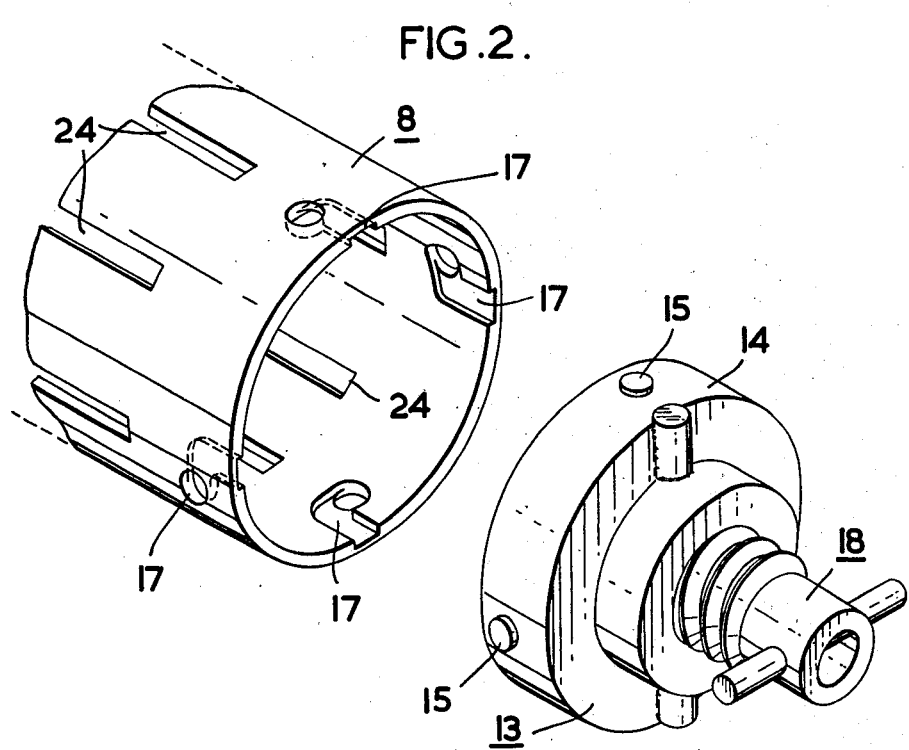
FIGURE 2 is a detail of FIGURE 1 shown in isometric form.

In FIGS. 1 and 2 of the drawings there is shown a nuclear reactor fuel element 1 comprising a cylindrical rod of uranium 2 enclosed in a magnesium alloy sheath 3 having external helical fins 4. The uranium rod 2 has a series of spaced circumferential grooves 5 along its length and the sheath 3 is closed at either end by end caps 6 sealed by circumferential seam welds 7, the end caps 6 being of the same material as the sheath 3.

The fuel element 1 is shown held in a clamp of composite tubular form comprising a tubular body part 8 made in two cojoined tubular sections 9 and 10. The section 9 is of mild steel and forms three quarters of the length of the body part 8 while the section 10 is of stainless steel and is connected end to end with the section 9 by a circumferential butt weld 11. The weld 11 is stress relieved and ground flush with the outer surface of the sections 9 and 10. The body part 8 is fitted with a screwed end cap 12 at one end and with a quick release end cap 13 at its other end. As shown in FIGURE 2, the quick release end cap 13 comprises a skirted plug 14 fitted with four pins 15 which are engageable with complementary L-shaped grooves 17 in the end of the body part 8. The quick release end cap 13 carries a clamping screw 18 comprising a threaded tubular stem 19 having an end flange 20 with an integral skirt 21. The fuel element 1 is clamped inside the body part 8 of the clamp between rings 22 and 23 which bear against the ends of the fins 4 of the fuel element. The ring 22 bears against the end cap 12 and clamping pressure is applied on the fuel element 1 through the ring 23 by turning down the clamping screw 18 to finger tightness. The body 8 of the clamp is perforated by longitudinal slots 24 while the end cap 12 is perforated by holes 25 and the skirt 21 of the clamping screw 18 is perforated by holes 26.

With the fuel element 1 held in the clamp as shown in the drawings pressurisation is carried out hydraulically in oil firstly preheating in the oil at 250° and 100 lbs./sq. in. pressure for 15 minutes, the pressure then being increased to 12000 lbs./sq. in. and maintained for 30 minutes. Using the clamp described which is 75% mild steel and 25% stainless steel an approximate match is obtained between the expansion of the clamp and the expansion of the uranium rod 2 of the fuel element. Hence the expansion of the sheath 3 is constrained to match the expansion of the rod 2 setting up a compressive strain along the length of the sheath 3.

On withdrawal from the oil the clamp initially cools faster than the fuel element 1, and if the clamp is not removed from the fuel element before cooling starts, additional compressive strain will be applied to the sheath 3 of the fuel element. However, this strain is avoided by releasing the end cap 13 before cooling starts thus allowing removal of the fuel element from the clamp before any extensive cooling has occurred. This is readily performed by unscrewing the clamping screw 18 when the end cap 13 is easily rotatable to release the pins 15 from the L-shaped grooves 17.

Approximate coefficients of thermal expansion for uranium, mild steel and stainless steel are respectively $14.5 \times 10^{-6}$ in./in./° C., $12 \times 10^{-6}$ in./in./0 C., and $18 \times 10^{-6}$ in./in./° C. so that accurate matching of the expansions of the clamp and the uranium rod 2 necessitates the use of a composite clamp with a proportion of the length made from each type of steel as described above.

Initial study of expansion data would suggest that matching of the expansion of the clamp and uranium rod is best achieved by a composite clamp consisting of half mild steel and half stainless steel and it is found that such is the case when gas pressurising at 500° C. However as shown by the following table, experiments have shown that when pressurising in oil at 250° C. better matching occurred with a clamp of 75% mild steel and 25% stainless steel. The explanation of the discrepancy is associated with the dimensional instability of beta quenched alpha annealed uranium rods which shrink when heated to the pressurising temperature of 250° C.

*Effect of Composite Clamps Pressurising in Oil at 250° C.*

| Clamp percent of mild steel Rest stainless steel | Equilibrium expansion of sheath 3 relative to uranium rod 2 of fuel element, inches |
|---|---|
| No clamp | 0.070 |
| 50-50 | 0.012 |
| 75-25 | 0.0025 |
| 75-25 | 0.002 |
| Mild Steel | −0.009 |
| Mild Steel | −0.009 |

It will be noted that using clamps made wholly of mild steel the sheath 3 is constrained to expand less than the uranium rod 2 thus setting up a compressive strain in the sheath 3 in addition to that initially applied. This is to be avoided and hence clamps made wholly from mild steel cannot be used.

Figure 3:
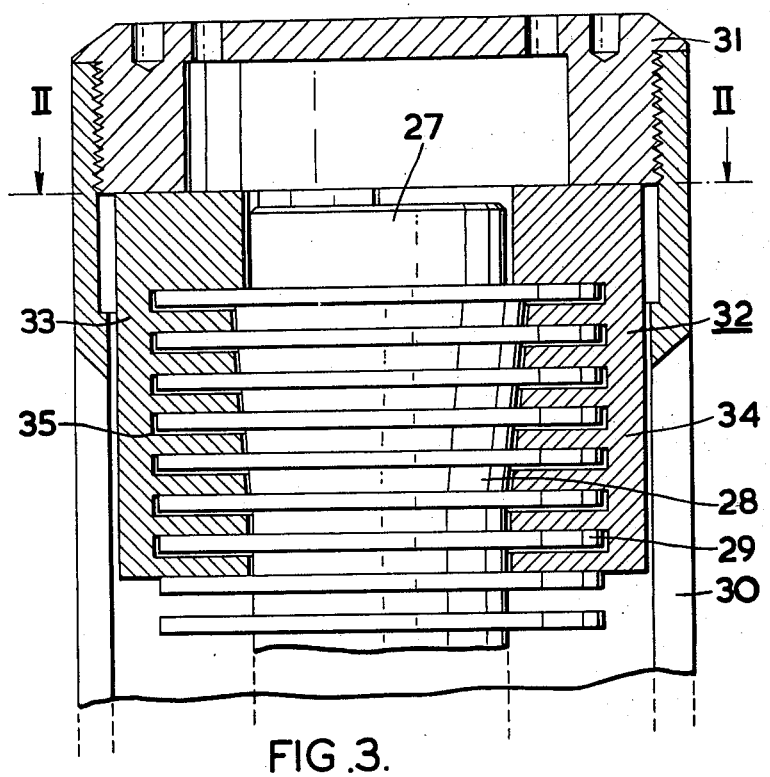
FIGURE 3 is a longitudinal sectional elevation of an end fitment used in conjunction with the clamp of FIGURE 1 fitted to a fuel element having a sheath with circumferential heat transfer fins.
Figure 4:
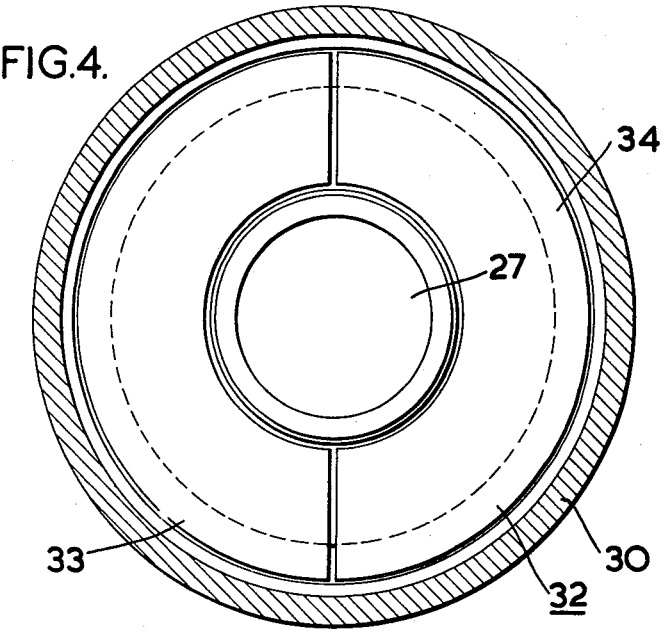
FIGURE 4 is a cross section along the line II—II in FIGURE 1.

Referring to FIGS 3 and 4 there is shown one end of a fuel element 27 having a sheath 28 with circumferential heat transfer fins 29. The fuel element 37 is shown held in a clamp such as is described above with reference to FIGS. 1 and 2 for applying a longitudinal compressive stress to the sheath 28 of the fuel element 27 while the fuel element 27 is subjected to external hydraulic or gas pressurisation at an elevated temperature.

Figure 6:
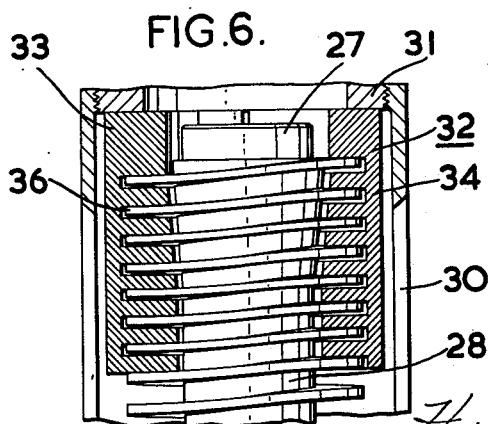
FIGURE 6 is a longitudinal sectional elevation of an end fitment used in conjunction with the clamp of FIG. 1 fitted to a fuel element having a sheath with a single start helical fin of short pitch.
Figure 5:
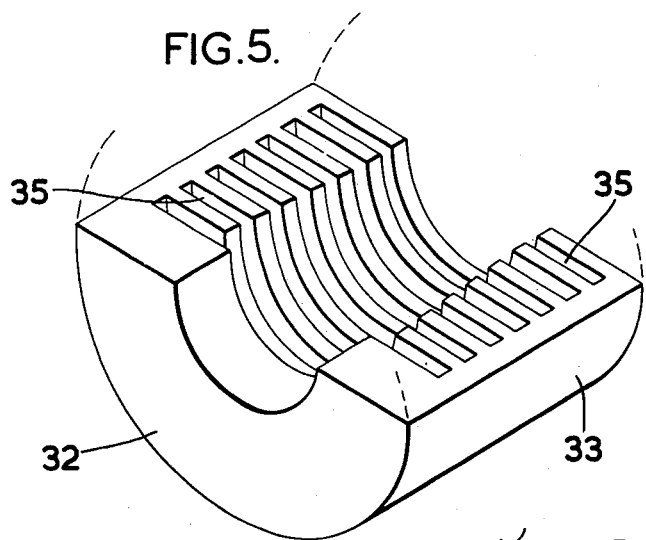
FIGURE 5 is a detail in isometric form of one half of the fitment shown in FIGS. 3 and 4.

The clamp has a tubular body 30 fitted at the end shown with a screwed end cap 31 and at the other end (not shown) with a bayonet fitted end cap having means for setting up the compressive loading in the sheath 28 of the fuel element 27. The loading is applied to the sheath 28 of the fuel element through end fitments 32 which engage with seven of the circumferential fins 29 at each end of the sheath 28. The end fitments 32 are each in two complementary halves 33 and 34 and as shown in FIG. 5 each half has an internal configuration of grooves 35 to fit round and engage with the fins 29 at each end of the sheath 28. By means of the end fitments 32, the loading of the clamp is distributed amongst the seven fins 29 at each end of the sheath 28 and hence localisation of loading on the terminal fin 29 at each end of the sheath is avoided. Where the sheath 28 has a single start helical fin 36 of short pitch (as shown in FIG. 6) the parts 33 and 34 of the end fitments 32, are made with an internal configuration to fit round and engage with several turns of the fin 36 at each end of the sheath 28 so that the loading of the clamp is distributed amongst these several turns and not localised on the first turn of the fin 36 at each end of the sheath 28. The embodiment shown in FIG. 6 is also applicable where the sheath of the fuel element has multistart helical fins of short pitch.

We claim:

1. A process for use in the manufacture of a nuclear fuel element comprising a member of fissile material enclosed in a protective sheath, comprising the steps of:
   (a) creating an initial compressive stress in the protective sheath by applying opposing forces to the opposite ends of the sheath;
   (b) subjecting the protective sheath to external pressurization at an elevated temperature in order to form the sheath into intimate contact with the member of fissile material contained therein;
   (c) progressively relieving the opposing forces to allow the sheath to elongate substantially by only the same amount as the fuel member on heating during pressurization.

2. A process as claimed in claim 1 wherein the opposing forces are applied by a clamping member having interconnected portions bearing against the ends of the protective sheath and having these portions interconnected by a member having a composite coefficient of thermal expansion which is substantially equal to the corresponding coefficient of the member of fissile material, and the relief of the opposing forces is effected by the thermal expansion of the interconnecting member.

3. A process for the manufacture of a nuclear reactor fuel element comprising a member of fissile material enclosed in a protective sheath, comprising the step of subjecting the fuel element sheath to external pressurization at an elevated temperature in order to form the sheath into intimate contact with the member of fissile material contained therein, the improvement characterized in that on heating during pressurization a longitudinal compressive stress is applied by a clamp to the sheath of the fuel element, the clamp being constructed in at least two parts of different materials joined end to end so as to have a longitudinal thermal expansion substantially equal to the longitudinal thermal expansion of the member of fissile material.

4. A clamp for applying a longitudinal compressive stress to the sheath of a nuclear reactor fuel element while the fuel element is subjected to external pressurization at an elevated temperature, said clamp comprising a tubular body made part of its length in mild steel, the remaining part of its length being of stainless steel, end caps for the ends of the tubular body, means detachably connecting at least one of the end caps to the tubular body, the proportion of mild steel length to stainless steel length being such that the composite coefficient of thermal expansion of the tubular body is substantially equal to the corresponding coefficient of the fissile material in the fuel element with which the clamp is to be used.

5. A clamp as claimed in claim 4 for use with a fuel element having a fissile member of beta quenched, alpha annealed, natural uranium metal, wherein three quarters of the length of the tubular body is of mild steel and the remainder is of stainless steel.

6. A clamp as claimed in claim 4 for use in the manufacture of a fuel element having a sheath with substantially transversely extending heat transfer fins further comprising end fitments for applying the loading of the clamp to several fins at each end of the sheath.

7. A clamp having end fitments as claimed in claim 6 wherein the end fitments are of tubular form, split diametrically into two halves and have an internal configuration so as to fit around and engage with the fins at the ends of the sheath.

References Cited in the file of this patent

FOREIGN PATENTS 1,095,412     Germany _____ Dec. 22, 1960